United States Patent [19]

Davey

[11] 4,336,474
[45] Jun. 22, 1982

[54] PHASE INTERLEAVED PERIPHERAL CONNECTOR RING END WINDING

[75] Inventor: Kent R. Davey, College Station, Tex.

[73] Assignee: Westinghouse Electric Corp., Pittsburgh, Pa.

[21] Appl. No.: 139,082

[22] Filed: Apr. 10, 1980

[51] Int. Cl.³ ............................................. H02K 3/12
[52] U.S. Cl. .................................... 310/179; 29/596; 310/201; 310/260
[58] Field of Search ............... 310/179, 180, 181, 201, 310/254, 258, 259, 260, 194, 208, 195, 166, 54; 29/596

[56] References Cited

U.S. PATENT DOCUMENTS

| 268,205 | 11/1882 | Edison | 310/195 |
| 2,407,935 | 9/1946 | Perfetti et al. | 310/201 |
| 3,252,027 | 5/1966 | Korinek | 310/201 X |
| 3,614,497 | 10/1971 | Brenner | 310/201 |
| 4,200,817 | 4/1980 | Bratoljic | 310/201 |

Primary Examiner—J. V. Truhe
Assistant Examiner—Morris Ginsburg
Attorney, Agent, or Firm—William D. Lanyi

[57] ABSTRACT

A multiphase stator winding for a dynamoelectric machine constituting a plurality of coil loops each of which have a plurality of coil sides of varying lengths that are embedded in stator core slots. Each coil loop has two straight coil sides embedded within the stator slots and an annular connector ring segment which connects the two straight coil sides in an end region of the stator. The connector ring segments are interspersed in the axial direction so that connector ring segments of identical phase are separated by connector ring segments of other phases.

6 Claims, 4 Drawing Figures

PHASE INTERLEAVED PERIPHERAL CONNECTOR RING END WINDING

BACKGROUND OF THE INVENTION

This invention relates to dynamoelectric machines having stator structures with multiloop coils disposed therein and more particularly to means for connecting straight coil portions disposed in stator slots.

Large dynamoelectric machines have evolved which use a rather complex stator winding to handle the voltages and current required by the imposed loading demands. A large number of stator slots, the use of parallel phase windings, and the multiple turns per phase winding necessitates the use of end connections which fit in a restricted space, provide rugged construction and provide the necessary electrical connection between stator coil sides.

SUMMARY OF THE INVENTION

The end connection design currently in use includes an end basket made of "diamond-shaped coils". This term is used to describe a stator coil winding configuration in which the end winding portions of the coils are shaped to extend from the core slots in both a radially and axially outward direction while circumferentially traversing a number of core slots. The result of these three directions of extension is a portion of a complex spiral. When a plurality of these coils are positioned over a plurality of oppositely extending coils, the resulting combination creates a diamond-shaped pattern. This pattern is well known to those skilled in the art and is referred to herein as a "diamond-shaped coil" construction. Pictorial representations of this type of coil configuration are shown in U.S. Pat. No. 3,435,517 issued to Fortenbach, et al. on Apr. 1, 1969; in U.S. Pat. No. 1,238,280 issued to Field on Aug. 28, 1917 and in U.S. Pat. No. 3,348,085 issued to Coggeshall, et al. on Oct. 17, 1967. Each coil includes two coil sides which each constitute a straight section which runs the length of the stator slot and a complicated curved section at each axial end of the stator. This curved section has a complex shape wherein it bends axially, radially and peripherally in the end turn regions. Manufacturing the curved section of the coil side typically requires a complex three dimensional form against which the coil side is bent and twisted. The stator coil sides are woven together to form the standard diamond shape end basket design which is the standard for large dynamoelectric machines.

This end basket design provides the necessary stator coil connections in a reasonably compact and rugged structure. One of the major disadvantages of such end basket design is that this interweaving of the coils makes the removal of a single coil side from the bottom of a stator slot very difficult to accomplish because it also requires removing twelve to eighteen top coil sides which obstruct access to that bottom coil.

When an operating dynamoelectric machine sustains a service outage and a bottom coil side requires repair or replacement, multiple top coil sides must be removed from the stator to extract the subject bottom coil side. Field removal of the top coil sides is also a slow and costly process which necessitates the removal of coil bracing in a large portion of the machine along with the associated slot disposed coil wedging. In this process of unbracing the machine and removing the coils, the machine is vulnerable to additional damage. Upon disassembly and repair, the stator coils require reassembly and the bracing system must be rebuilt.

In copending application Ser. No. 139,083, by Mr. L. Long, filed on Apr. 10, 1980, and assigned to the assignee of the present application, a dynamoelectric machine is disclosed that includes a stator winding comprising a plurality of stator coil loops each of which has two straight coil sides which are embedded within the core slots and extend the entire length of the stator core, protruding into the end regions. A C-shaped connector ring segment in disposed in a first end region for connecting the two straight coil sides. The loops are joined in a predetermined manner according to their phase relationship by other connector ring segments disposed in the second end region. The connector ring segments eliminate many problems and simplify others encountered in fabricating and making field repairs to the machine.

The forces on the winding in the stator end region under steady state and short circuit conditions are extremely large. For example, a typical 25,000 amp, 20 kV turbine generator may have forces from 70 to 100 pounds per inch under steady state conditions and thus imposes tremendous loads on the end turn bracing. It has been found that these forces are generally equivalent in both the conventional diamond shaped end winding or the C-shaped connector ring type discussed above.

It has also been found that a full phase interspersal of the connector ring segments in the end turn regions reduces the forces on the coil sides and connector ring segments by approximately one-half. Heuristically this can be explained by noting that the current of the immediately surrounding coil sides of any subject coil sides is one-half the magnitude of the current in the subject coil side at its peak. This does not ensure halving of all the forces on all the internal coil sides, since the topology of the winding varies. Peripheral currents above and below a subject coil side are such that their fields add to the subject coil sides for many cases and thus appear at first to yield higher forces. However, at any instance when the subject coil side current is peaking, the surrounding coil side currents are halved. As such the effect of adjacent peripheral connector ring segment is halved because the connector ring segments of the same phase are located three positions away. Furthermore, the effect of other connector ring segments is insignificant since, for each pair of like phase coil ring segments, currents are in the opposite direction and field cancellation occurs.

Calculations performed to determine the overall reductions obtained through phase interspersal indicate a reduction between 48% and 68% of the end turn field of the diamond shaped end turn winding.

Through the use of interspersed windings in the end turn region, the leakage reactance is reduced to the extent of the end turn contribution. This constitutes a lower transient reactance which provides improved stability under fault conditions.

Secondly, the end turn regions' circulating currents are reduced since less flux links the end turns. As such, heating in the end turn regions is reduced by a factor of four.

Thirdly, any differential reactance unbalance in the phases is minimized because of the mixed distribution of phases.

In conclusion, the phase interspersal of connector ring segments, as disclosed in this specification, reduces fields in the end turn regions by approximately 50%. The effects of this reduction are four-fold: (1) forces on end turn conductors are reduced by 50%; (2) lower transient reactance provides improved stability; (3) eddy currents in the end turn region are reduced and thus enable a reduction in $I^2R$ losses; and (4) differential reactance unbalance in the phases is minimized.

DESCRIPTION OF THE PREFERRED EMBODIMENT

Figure 1:
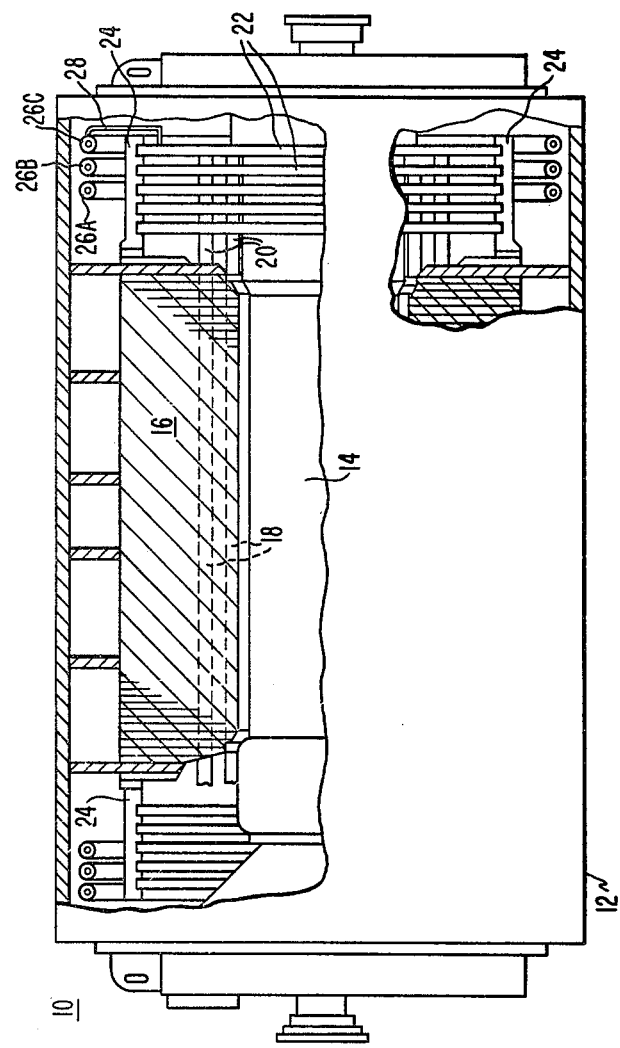
FIG. 1 is a partial sectional view of a dynamoelectric machine made in accordance with the present invention.

Referring to the drawings, FIG. 1 shows a partial sectional view of a dynamoelectric machine 10 having an outer casing 12, a rotor 14 and a stator structure 16 which has multi-loop coils 18 disposed therein constituting a multiphase stator winding. Each coil loop constitutes two coil sides 20 which are embedded within stator slots (not shown) around the inner periphery of the stator structure's core and a connector ring segment 22 which joins the coil side. The connector ring segments 22 are braced by a plurality of mounting brackets 24. On each end of the stator 16 there are three parallel rings 26A, 26B, and 26C which are part of the cooling system for the coils of the dynamoelectric machine and are connected to the coils by electrically insulated tubing 28.

Figure 2:
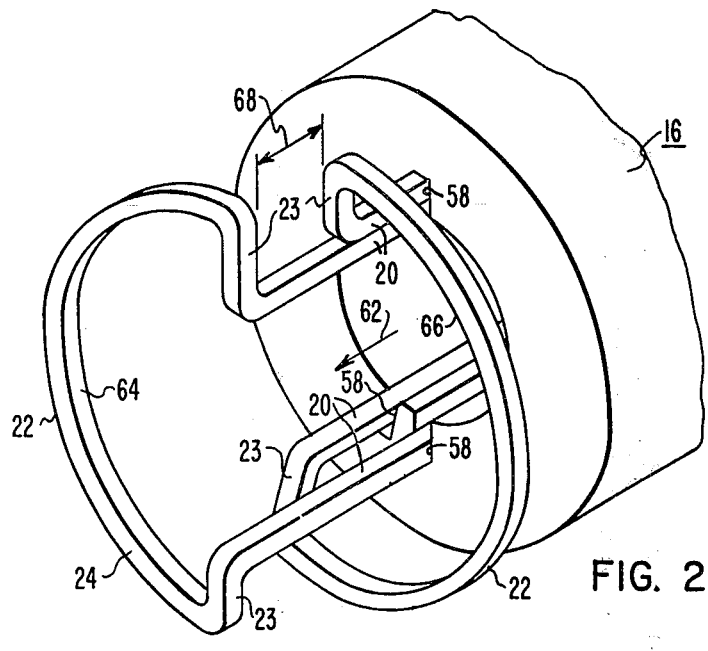
FIG. 2 is a pictorial view of one end region of the dynamoelectric machine of FIG. 1 showing exemplary connections between four coil sides and two connector rings.
Figure 3:
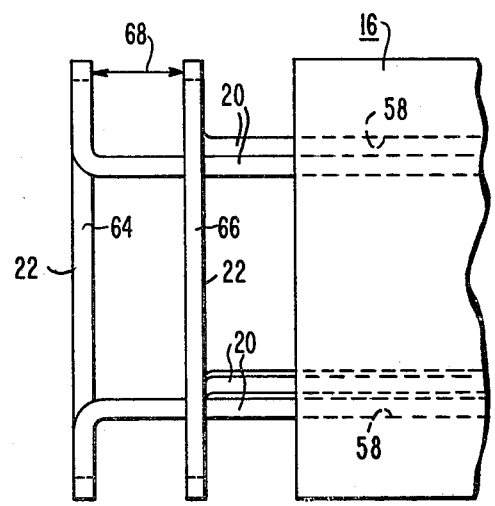
FIG. 3 is a transverse view of the dynamoelectric machine's stator end region with the four coil sides and two connector rings illustrated in FIG. 2.

To further describe the shape and disposition of the coil side 20 and connector ring 22 interrelationship, FIGS. 2 and 3 depict one end of the stator 16 with only two connector rings 22 and four coil sides 20 associated with it. It should be understood that a thirty-six slot stator has a total of seventy-two coil sides 20 and thirty-six connector rings 22 but FIGS. 2 and 3, for reasons of illustrative clarity and simplicity, show only two connector rings 22 and thier associated coil sides 20.

End turns of two coil loops, 64 and 66, are shown in FIG. 2. Coil loop 64 includes two straight coil sides 20 which are disposed in slots 58 formed along stator 16's inner periphery and connected to end region connector ring segment 22, by a transition segment 23, which electrically connects the coil sides. A multiphase winding normally constitutes a plurality of multi-loop coils each having a number of loops or turns equal to the number of slots per pole phase in the multiphase winding. Each loop has two coil sides 20 which are circumferentially spaced around the inner periphery of the stator's inner periphery an arcuate distance equal to the coil pitch. The two coil sides 20 are joined at one axial end of the stator 16 by a connector ring segments 22 to complete each coil loop.

FIGS. 2 and 3 reflect common practice for coil side disposition in large dynamoelectric machines in that multiple coil sides (typically two) are embedded in each slot, in the bottom or radially outer position and the other in the top or radially inner position. For the sake of clarity only one slot is illustrated as housing two coil sides while the remaining slots each house one coil side. One side of each coil loop occupies the top position and the other side of the coil loop occupies the bottom position in the stator core slots. Connections between top and bottom coil sides are provided by the annular connector ring segments 22 on each end of the dynamoelectric machine. Each connector ring is separated from its adjacent rings by a distance 68 which is a function of the lengths of its associated coil sides 20. Two terminal ends of each coil are brought out of the stator structure 16 for a predetermined distance to facilitate interconnection to other coils or act as phase leads depending upon the winding technique. When the stator structure is assembled, the coil sides are usually inserted consecutively in the slots in phase rotation so that each top coil side is connected to a bottom coil side of a previously inserted coil loop of the same phase.

The two straight coil sides 20 which are included on coil loop 66 and are axially shorter than the straight coil sides 20 used on coil loop 64 by a distance 68.

FIG. 2 also points out that the annular connector ring segments 22 join portions of the coil sides 20 which extend axially beyond the stator slots 58. The two coil sides 20 of each loop, which are joined by each connector ring segment 22, occupy top and bottom positions, respectively, such that the top coil sides are closer to the stator's inner periphery and the bottom coil sides are further from the stator's inner periphery.

Figure 4:
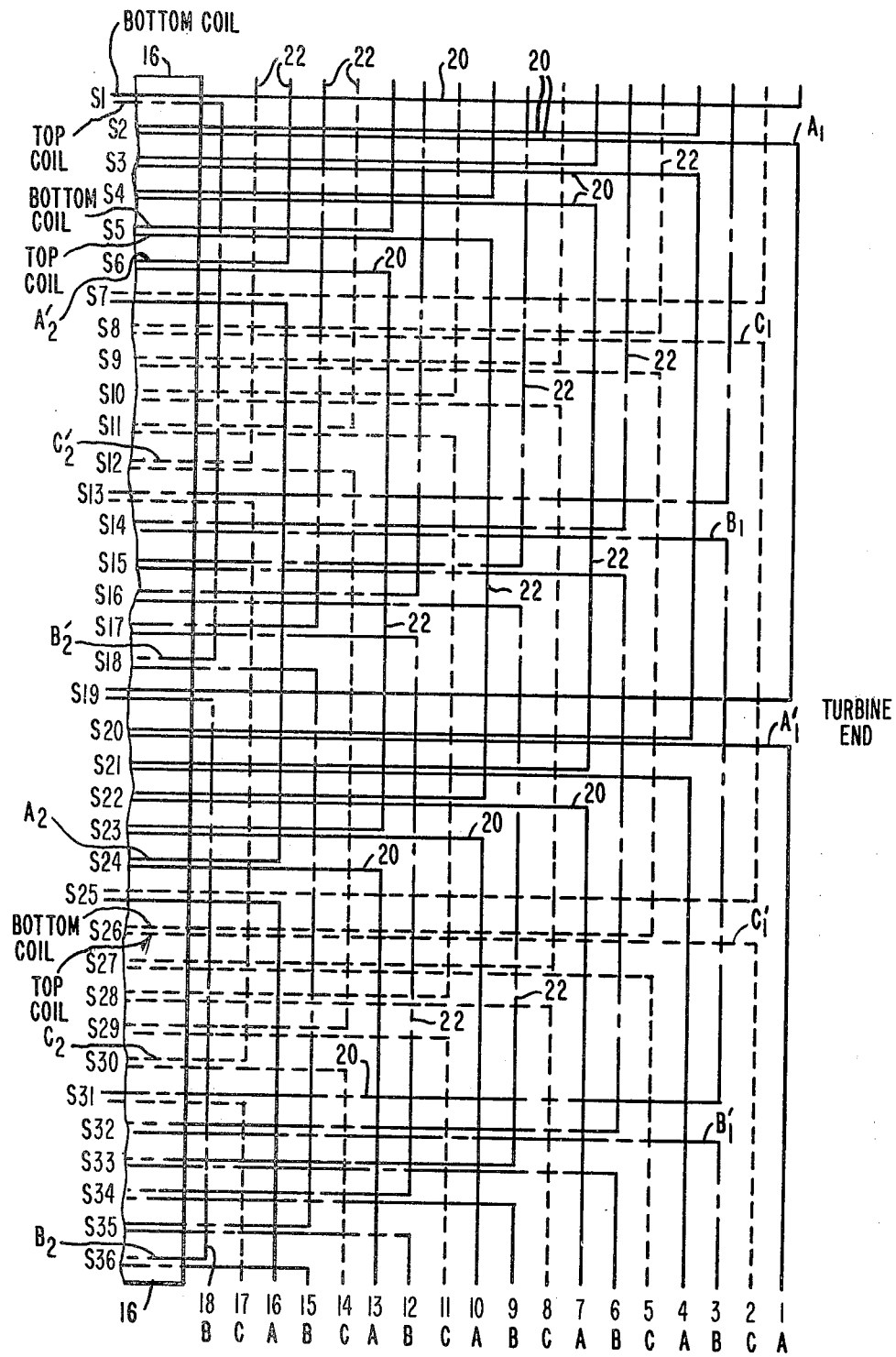
FIG. 4 is a schematic diagram of the stator winding of the dynamoelectric machine, made in accordance with the present invention, which is "unwrapped" into a plane.

A view of the stator structure 16 with one of its end turn regions, the turbine end, folded into a plane is shown in FIG. 4 which is a schematic diagram of split phase windings A, B, and C for a 36 slot, two pole dynamoelectric machine. 36 slots are shown in FIG. 4, with 18 axial positions being provided on each end of the dynamoelectric machine's stator. Since it is customary to assemble at least two coil sides in each stator slot in a relatively radial fashion, the coil sides' positions in each slot are referenced as "top coil" for top or radially inner disposition and "bottom coil" for bottom or radially outer disposition. The length of the coil sides 20 varies from one slot to another as may be seen from comparing the top coil side housed in slot 1 with the top coil side of slot 6 so as to cooperate with the connector ring segments disposed at positions 1 through 18 on each end of the dynamoelectric machine.

Since each phase is split, two separate winding portions (e.g., A and A′) constitute each phase winding and may be electrically connected in series or parallel. The phase leads for the phase winding portions are designated in FIG. 4 as $A_1$, $A_2$, $A'_1$, $A'_2$, $B_1$, $B_2$, $B'_1$, $B'_2$, $C_1$, $C_2$, $C'_1$, and $C'_2$. The leads of each phase may be electrically connected in the aforementioned series or parallel manner, typically on the exciter end, as desired. Intraphase connection may be accomplished by any suitable means although the connector ring segments 22 of the present invention are preferable.

FIG. 4 is a schematic phase connection diagram which illustrates the phase interspersal technique of the present invention. The thirty-six stator slots are represented by reference numerals S1 to S36. In each slot there is both a top and a bottom coil. Three of these combinations are labeled with both a "top coil" and "bottom coil" designation, but it should be understood that each of the thirty-six slots has such a combination with the upper line of each slot representing its bottom coil and the lower line representing its top coil. Also in FIG. 4, phase A is represented by a solid line, phase B by a short dash-long dash line and phase C by a dashed line. The lines extending perpendicularly from the stator 16 represent the coil sides 20 while the lines running in a parallel direction to the stator 16 represent the connector rings 22. In FIG. 4, an exemplary plurality of these lines are so labeled, but it should be understood that reference numeral 20 equally is applicable to all perpendicularly extending lines and reference numeral 20 is applicable to all lines which are parallel to the stator 16. The axially disposed connector ring positions are numbered from 1 to 18 with number 18 representing the connector ring position most proximate the stator 16. The axial distance between axially adjacent connector rings 22 is shown by reference numeral 68 in FIGS. 2 and 3. The phase of each of the eighteen axial positions is further labeled as A, B or C to illustrate the phase interspersal technique of the present invention. It should be obvious from FIG. 4 and the discussion above that no connector ring position is adjacent another connector ring position of the same phase.

To further illustrate the connection method of the present invention, as shown in FIG. 4, the components of phase A will be discussed in greater detail below. The coil sides 20 of phase A are located in the top portions of slots 2 to 7 and 20 to 25 and in the bottom portions of slots 1 to 6 and 19 to 24. As described above, the two separate phase A windings are designated by reference numerals A and A'. Winding A' is disposed in the top portions of slots 20 to 25 and the bottom portions of slots 1 to 6 while winding A is disposed in the top portions of slots 2 to 7 and the bottom portions of slots 19 to 24. The lengths of coil sides 20 of phase A are preselected to position their corresponding connector rings 22 at the axial connector ring positions 1, 4, 7, 10, 13 and 16. The phase leads of winding A are labeled $A_1$ and $A_2$ while the phase leads of winding A' are labeled $A'_1$ and $A'_2$.

Although only phase A is described in detail above, the following table, viewed in conjunction with FIG. 4, will precisely define the position of each coil side 20 within the thirty-six slots.

| Slot | Top | Bottom |
| --- | --- | --- |
| 1 | B | A |
| 2 | A | A |
| 3 | A | A |
| 4 | A | A |
| 5 | A | A |
| 6 | A | A |
| 7 | A | C |
| 8 | C | C |
| 9 | C | C |
| 10 | C | C |
| 11 | C | C |
| 12 | C | C |
| 13 | C | B |
| 14 | B | B |
| 15 | B | B |
| 16 | B | B |
| 17 | B | B |
| 18 | B | B |
| 19 | B | A |
| 20 | A | A |
| 21 | A | A |
| 22 | A | A |
| 23 | A | A |
| 24 | A | A |
| 25 | A | C |
| 26 | C | C |
| 27 | C | C |
| 28 | C | C |
| 29 | C | C |
| 30 | C | C |
| 31 | C | B |
| 32 | B | B |
| 33 | B | B |
| 34 | B | B |
| 35 | B | B |
| 36 | B | B |

It should also be apparent that each slot has top and bottom coils of the same phase except slots 1, 7, 13, 19, 25 and 31 which have coils of different phases disposed within them.

As seen in FIG. 4 the coil sides 20 and connector ring segments 22 are so disposed that the connector ring segments 22 of the three phases are axially interspersed.

On each axial end of stator 16 the connector rings 22 for the three phases are alternated in the following order proceeding away from the stator: B phase, C phase, and A phase. For example, B phase's connector ring segments closest to stator 16 on the turbine end extend between bottom and top coil sides respectively disposed in slots 1 and 18 and in slots 19 and 36. It can be shown that electromagnetic forces on the connector rings 22 can be reduced approximately 50% when the present phase interspersal structure is utilized rather than diamond shaped coils. Additional benefits of such connector ring segment phase interspersal include improved stability from lower transient reactance, reduced eddy current losses, and minimization of differential reactance unbalance in the phases.

Although the embodiments of this invention are shown when applied to a 36 slot machine it is to be understood that the connections and relative phase dispositions for any number of slots may be performed in the same way. However, it is in order to point out the difference in conductor length that occurs when comparing the present invention winding to the "diamond" winding. For a typical 36 slot two pole 870 MVA generator, the excess conductor material of the present invention is approximately 29% more than a comparable generator wound with the conventional diamond shaped coils. The generator's diameter would remain unchanged, but the overall length thereof would be 410½ inches as compared to the conventional generator's length of 362 inches. This is a 13.40% increase in length. Due to the relatively larger amount of conductor material and generator length required for the present invention, the previously mentioned advantages and benefits must be weighed thereagainst to determine the feasability of applying it in any specific application.

It should be apparent to one skilled in the art that the present invention provides for an interspersal of phases in the end winding portion of a stator coil structure. It should be further apparent that, although the phases of the top and bottom coils are offset by one slot, other configurations could be adopted which result in interspersal end windings as described above.

We claim:
1. A dynamoelectric machine comprising:
   a generally tubular stator core having a plurality of slots in said core's inner periphery;

a multiphase winding constituting a plurality of phase coils, each of said phase coils including a plurality of coil sides receivable in said stator slots and a plurality of arcuate connector ring segments disposed on each end of the stator core electrically joining the coil sides, said connector ring segments being axially interspersed according to phase.

2. The dynamoelectric machine of claim 1 wherein each of said stator slots houses a top, radially inner coil side and a bottom, radially outer coil side, each of said connector ring segments connecting a top coil side housed in one slot to a bottom coil side housed in another slot.

3. A dynamoelectric machine comprising:
a generally tubular spaced stator core having axially extending slots spaced around the core's inner periphery; and
a multiphase winding disposed in said slots, said winding comprising a plurality of coil loops circumscribed about one another, each coil loop having a first and a second coil side circumferentially separated by a coil pitch in different slots, said first side constituting a top coil side and said second side constituting a bottom coil side, and a connector ring segment joining said coil sides wherein adjacent connector ring segments are interspersed according to phase.

4. A dynamoelectric machine, comprising:
a generally tubular stator core, said core having a plurality of axial extending slots in the inner periphery of said core;
a plurality of coil sides, each of said coil sides disposed in a preselected one of said slots, each of said coil sides being arranged so as to constitute a predetermined one of three electrical phases, said plurality of coil sides being equally divided into three phase groups, each of said phase groups representing a predetermined one of said three electrical phases, said coil sides being further grouped into a plurality of phase pairs, each of said phase pairs comprising a first and a second coil side, said first and second coil sides being from the same phase group, said first coil side being disposed in a different coil slot than said second coil side;
a plurality of connector rings, each of said connector rings having a first and a second terminus, said first terminus being electrically connected to said first coil side of a preselected phase pair and said second terminus being electrically connected to said second coil side of said preselected phase pair, said plurality of connector rings being disposed axially of said stator core, and said plurality of connector rings being axially interspersed according to the electrical phase of its electrically connected phase pair.

5. The dynamoelectric machine of claim 4, wherein:
a preselected two of said coil sides are disposed in each of said slots, the first of said two coil sides being a bottom coil disposed in a radially outward portion of said slot and the second of said two coil sides being a top coil disposed in a radially inward portion of said slot.

6. The dynamoelectric machine of claim 5, wherein:
each of said connector rings is electrically connected to a preselected one of the top coils and a preselected one of the bottom coils.

* * * * *